United States Patent [19]
Siebler et al.

[11] Patent Number: 5,826,945
[45] Date of Patent: Oct. 27, 1998

[54] BENCH SEAT SYSTEM FOR MOTOR VEHICLES ESPECIALLY FOR SMALL VANS

[75] Inventors: Helmut Siebler; Georgios Tsilchorozidis, both of Stuttgart; Dieter Mankiewicz, Lohr; Ulrich-Jürgen Mampe, Lohr; Norbert Kübert, Lohr; Wolfgang Kroner, Flörsbachtal; Gerd Ponath, Lohr, all of Germany

[73] Assignee: Mercedes-Benz AG, Stuttgart, Germany

[21] Appl. No.: 589,065

[22] Filed: Jan. 23, 1996

[30] Foreign Application Priority Data

Jan. 23, 1995 [DE] Germany ................. 195 01 743.9

[51] Int. Cl.$^6$ ........................................... A47C 7/02
[52] U.S. Cl. .................... 297/452.18; 297/232; 297/484; 296/63
[58] Field of Search .................. 297/130, 232, 297/257, 452.18, 452.19, 452.2; 296/63, 65.1

[56] References Cited

U.S. PATENT DOCUMENTS

| | | | |
|---|---|---|---|
| 2,720,914 | 10/1955 | Doty et al. | 297/452.19 |
| 3,870,363 | 3/1975 | Bareki | 297/232 |
| 4,630,864 | 12/1986 | Toll | 297/232 |
| 4,971,379 | 11/1990 | Rumpel et al. | 297/63 |
| 5,123,673 | 6/1992 | Tame | 297/484 X |
| 5,249,841 | 10/1993 | Chales | 297/452.18 |
| 5,393,116 | 2/1995 | Bolsworth et al. | 296/65.1 |
| 5,547,242 | 8/1996 | Dukatz et al. | 296/65.1 |

*Primary Examiner*—Laurie K. Cranmer
*Attorney, Agent, or Firm*—Evenson McKeown Edwards & Lenahan PLL

[57] ABSTRACT

A bench seat system for small motor vehicles, such as small vans, includes at least one seat with a seat upper frame to receive seat cushions and a backrest and with seat feet connected with the seat upper frame for anchoring to the body floor of the motor vehicle. To achieve a modular system from which bench seats with different widths and numbers of seats can be assembled in an economical fashion, the upper frame of the seat is assembled from a plurality of L-shaped pillars spaced apart from one another at seat intervals. The pillars are rigidly connected with one another by a plurality of cross tubes. Each seat is then delimited laterally by two pillars. One seat foot is associated with each seat, being fastened in the area between two pillars on two cross tubes, projecting at right angles from the latter, which cross tubes connect the horizontal legs of the L-shaped pillars with one another.

50 Claims, 8 Drawing Sheets

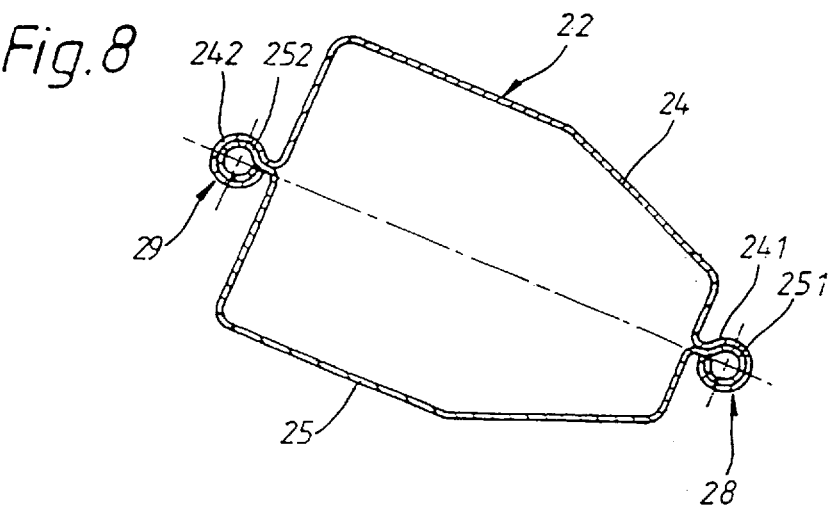
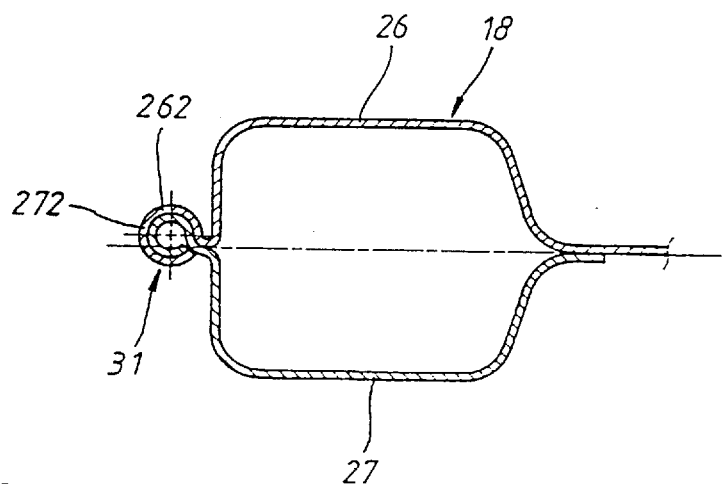
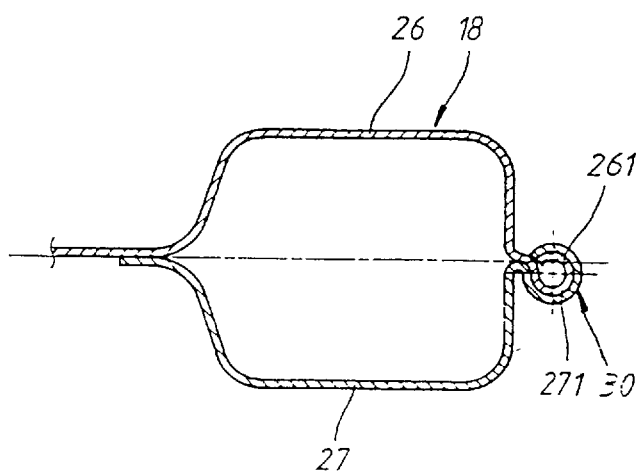

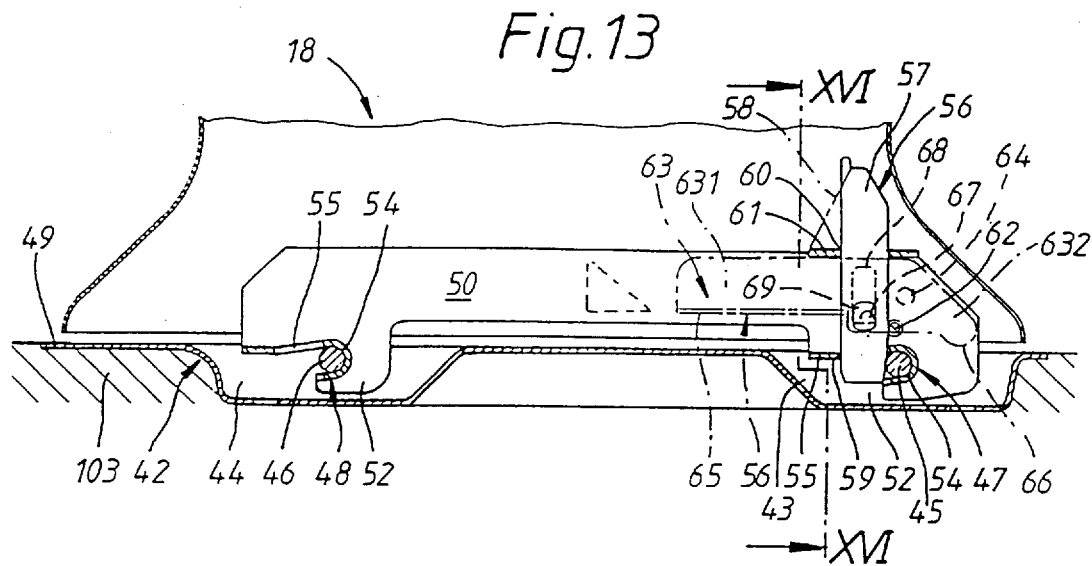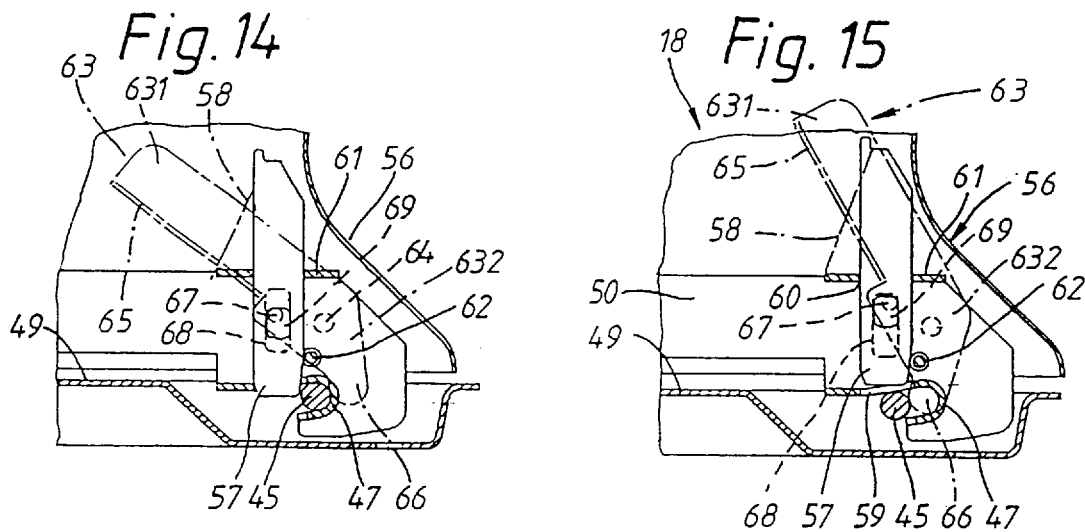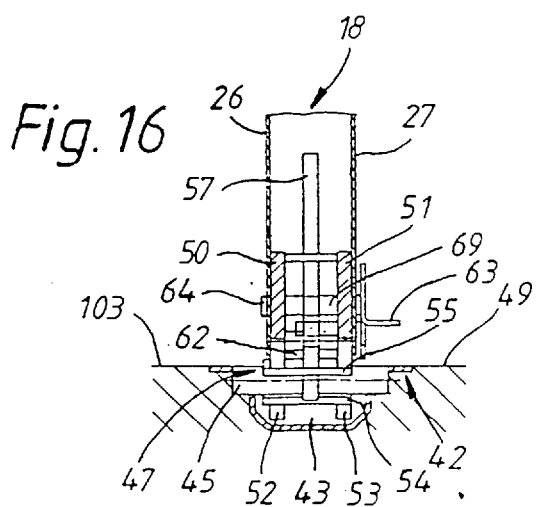

BENCH SEAT SYSTEM FOR MOTOR VEHICLES ESPECIALLY FOR SMALL VANS

BACKGROUND AND SUMMARY OF THE INVENTION

The invention relates to a bench seat system with at least one passenger seat for motor vehicles, especially for small vans.

In one known bench seat system as disclosed in European Patent Document EP 03 48 096 A2, an upper frame has two parallel cross tubes with a circular cross section, supported by seat feet anchorable in the vehicle floor. Each seat foot has two legs connected with one another by a diagonal strut. The cross tubes are connected together by two or more horizontal lengthwise members located at a distance from one another, so-called pillars, extending at right angles to the cross tubes. One pillar is located on each side of the bench seat and one pillar is located between a pair of seats on the bench seat that adjoin one another. The seat cushion is supported by the cross tubes and the backrest is held in the pivot bearings provided in the pillars. The external pillars of the bench seat support an integral armrest.

A known three-seat bench seat system as disclosed in European Patent Document EP 0 397 333 A2, has a one-piece seat upper frame that receives a one-piece seat cushion bolster and a one-piece backrest bolster and is rigidly connected by a seat foot on both of the sides that extend transversely to the lengthwise axis of the body of the vehicle, said foot projecting downward at right angles and extending parallel to the lengthwise axis of the body. The bench seat is removably anchored in the body floor by the seat feet, for which purpose a pair of seat foot receptacles is provided in the body floor with a transverse distance between them. In each seat foot receptacle, a pair of locking pins spaced lengthwise from one another is fastened which are gripped by a pair of U-shaped slots molded in the ends of the seat feet. The forward slot in the end of the seat foot extends approximately horizontally and the rear slot extends approximately vertically. The bench seat is mounted on the two front locking pins by lifting the backrest at a slight angle so that these pins slide into the front U-shaped slots, and it is then lowered at the rear so that the rear locking pins engage the two rear U-shaped vertical slots. A pawl associated with a rear U-shaped slot and pivotably mounted on the seat foot then pivots with a locking hook beneath the rear locking pins and locks the bench seat to the body floor. To remove the bench seat, the pawl must first be manually pivoted, whereupon the seat can first be lifted off the locking pins at the rear, and then be pulled off the front locking pins.

In small vans for transporting people, a plurality of bench seats is arranged one behind the other as a rule. Usually such small vans are accessible through a sliding door on the side, so that access to the rear bench seats must remain, as seen from the door opening. Depending on the customer's wishes and the type of vehicle, such small vans can be equipped with two or three bench seats, which can optionally have two or three seats on them.

A goal of the invention is to design a motor vehicle bench seat of the general type referred to above in such fashion that, depending on the desired number of seats, it can be assembled with different numbers of seats from prefabricated identical individual elements in the manner of a kit. In addition, the bench seat is designed to be readily interchangeable, with the safety belts associated with each seat not impeding rapid installation and removal, and in the event of a crash, the seat assembly must reliably provide for transfer of the tensile forces exerted by the passengers against safety belts into the vehicle body.

This goal is achieved according to preferred embodiments of the invention by providing a bench seat assembly with at least one passenger seat for motor vehicles such as small vans, each of said at least one passenger seat comprising: an L-shaped pillar at each side of said passenger seat, each said L-shaped pillar including a long leg forming a substantially vertically extending seat back support and a short leg forming a substantially horizontally extending seat cushion support, a plurality of cross tubes rigidly connecting said L-shaped pillars together, and at least one seat foot supportably connected to the cross tubes and extending downwardly to a vehicle floor when in an in-use position in a vehicle.

The bench seat according to the invention is assembled independently of the desired bench seat width and number of seats, from three basic elements, namely the L-shaped pillars, the cross tubes, and the seat feet. The number of pillars and seat feet required depends on the number of seats desired per bench seat. One individual seat requires two external pillars and two seat feet. In a two-seat bench seat, three pillars and three seat feet are required, while a three-seat bench seat requires four pillars and three seat feet. In addition it is also possible to equip the bench seat with seats of different widths, so that the modular system can also be used with the same advantage when the widths of the seats desired are different. A different seat width may become necessary for example because with a plurality, for example three, seat bench seats, owing to the necessary access to the rear bench seat, the one or two bench seats that are located in front of it in the direction of the door opening must be made narrower, i.e. with a smaller bench seat width. Thus, with the kit system for bench seats according to the invention, two-seat bench seats and three-seat bench seats with the same seat width and a different bench seat width as well as three feet bench seats and two-feet bench seats with the same seat bench widths and different seat widths can be made economically.

By virtue of the L-shaped pillars that limit each seat on both sides, with their long legs extending up to the upper edge of the seat back, the safety belts and belt locks of the safety belt systems associated with each seat can be fastened to the pillars, so that the forces accepted by the safety belt system can be conducted through the seat feet into the body floor. The safety belt systems that are fastened to the bench seat itself do not impede the installation and removal of the bench seats or cause any problems since they are removed together with the bench seats and do not have any adverse effects on the loading area that results when the bench seats are removed.

Advantageous embodiments of the bench seat according to preferred embodiments of the invention with advantageous improvements and designs are described herein and in the claims.

According to one advantageous embodiment of the invention, the pillars and/or the seat feet are each assembled from two half shells into hollow box shapes, with the two half shells, preferably made of high-strength steel, being connected with one another along their junctions by a rolled seam. Then the two half shells abut one another at their contact points with flanges that are bent approximately at right angles, which are rolled by a rolling tool together with the rolled seam.

With this design of the pillars and seat feet in combination with the hollow cross tubes, a lightweight design is achieved for the bench seat together with high rigidity. This makes a significant contribution to reduction of the vehicle weight and has a positive influence on its fuel consumption. The rolled seam for connecting the two half shells is a positive connection that requires no further work steps. Manufacturing preparations are therefore simpler and manufacturing time is considerably shortened. The shape of the rolled seam and the fact that it extends continuously in the area of compressive stress of the pillar and seat foot results in an increase in its freedom from kinking. In addition, the rolled seam produces a large radius on the outside which suffices to meet the requirements on the head impact area. By virtue of this and the fact that there are no sharp edges anywhere, no finishing work and no covering parts for the connections between the two half shells of the pillar and seat foot are required. The seat foot displays a suitable exterior and need not be covered.

According to one advantageous embodiment of the invention, on at least one external pillar near the upper end of the long leg, a retaining cable is fastened to connect the bench seat to a side wall of the body of the motor vehicle. The retaining cable is preferably made in the form of a loop received endwise in a steel thimble in the shape of a shackle, with the steel thimble being held on a threaded bolt inserted into the upper cross tube endwise. With the flexible wall connection of the bench seat, which can be released quickly and without tools when the bench seat is removed, the forces of the safety belts at the seat next to the wall can be conducted directly into the side wall of the body. The flexibility of the wall connection thus permits movements of the bench seats transversely with respect to the lengthwise axis of the body. The threaded bolt for receiving the steel thimble is inserted without preparatory assembly work into the cross tube which is open at the end, and welded therein. If the bench seat is made wide enough that it extends from one side wall of the body to the other side wall of the body, a similar flexible wall connection of the bench seat is provided on each side wall of the body.

According to one advantageous embodiment of the invention, the upper end of the long leg of the outer pillar supporting the wall connection is reinforced by two sections that are mirror images of one another. This reinforcement makes it possible to equip the external seat on the bench seat that immediately abuts the body wall with a three-point safety belt system, with the reversal point of the safety belt at the shoulder being established by a belt reverser, fastened to the reinforcement.

According to one preferred embodiment of the invention, a foot receptacle fastened to the body floor is provided for fastening the seat feet to the body floor. Each foot receptacle has an elongate mounting plate with two grooves provided on the lengthwise axis of the plate at a distance from one another, and two locking pins each aligned in a groove crosswise to the lengthwise axis of the plate. At the end of each seat foot that faces away from the upper frame of the seat, two locking hooks provided at a distance from one another are located in a fixed position, said hooks projecting downward from the end of the seat foot and fitting behind the locking pins in the two grooves. A manually releasable quick connect which is associated with at least one locking hook on a seat foot of the bench seat prevents the locking pin overlapped by the locking hook from escaping from the locking hook and thus secures the bench seat against inadvertent lifting out of its foot receptacles.

Other objects, advantages and novel features of the present invention will become apparent from the following detailed description of the invention when considered in conjunction with the accompanying drawings.

BRIEF DESCRIPTION OF THE DRAWINGS

FIG. 8 is a sectional view along lines VIII—VIII in FIG. 7;

FIG. 9 is a sectional view along lines IX—IX in FIG. 7;

FIG. 10 is a sectional view along lines X—X in FIG. 7;

FIG. 13 is a cut-away view of a lengthwise section through a seat foot of a bench seat plus foot receptacle in the body floor of the small van, constructed to preferred embodiments of the present invention;

FIGS. 14 and 15 each show the same view as in FIG. 13, showing the right hand side of FIG. 13 and depicting different states of a quick connect for locking the bench seat; and FIG. 16 is a sectional view along line XVI—XVI in FIG. 13.

DETAILED DESCRIPTION OF THE DRAWINGS

Figure 1:
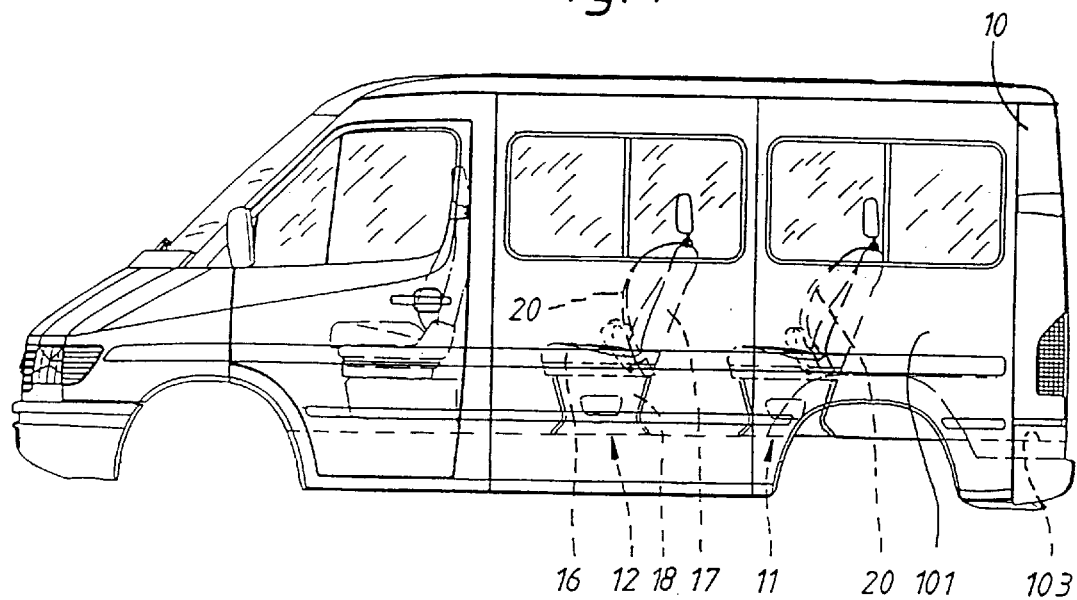
FIG. 1 is a schematic side view of a small van with a bench seat system configured according to a preferred embodiment of the invention and including two bench seats.
Figure 2:
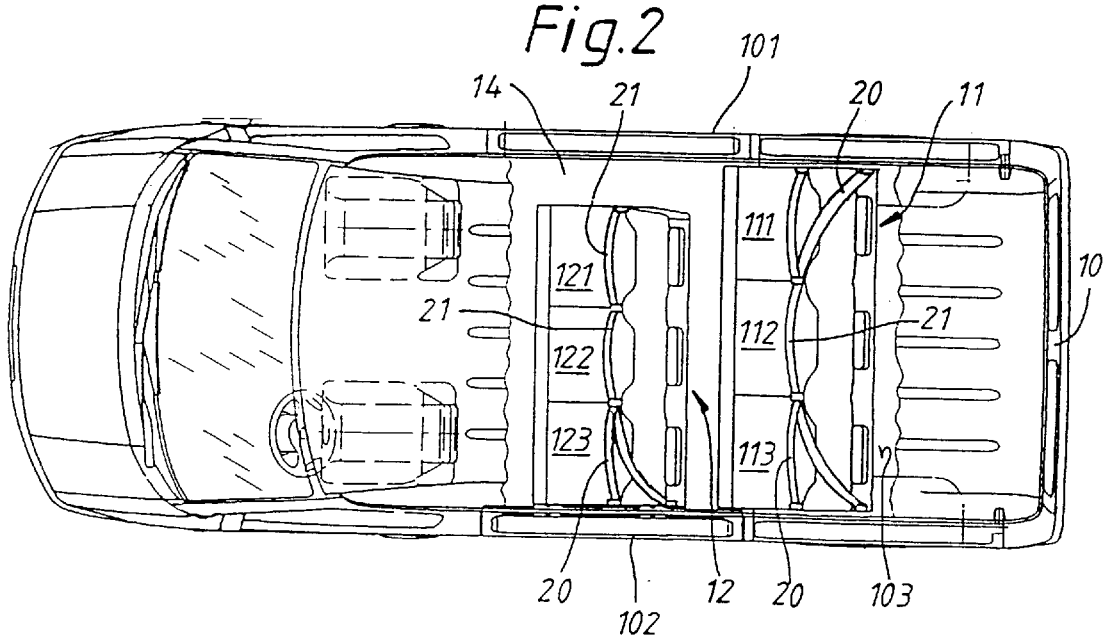
FIG. 2 is a top schematic view, with the van top removed for illustrative purposes, of the small van of FIG. 1.

In FIGS. 1 and 2, a small van body 10 is schematically shown which is equipped for passenger transport with two three-seat bench seats 11, 12. Access to bench seats 11, 12 is through a side sliding door in the right-hand side wall 101 of the body 10. The rear bench seat 11 extends with its three seats 111–113 from one body side wall 101 to the other body side wall 102, while the front bench seat 12 is made narrower so that, at its right side, an access 14 remains from the door opening in the right-hand body side wall 101 to the rear bench seat 11. The three seats 121–123 of the front bench seat 12 are made correspondingly narrower than the seats 111–113 of rear bench seat 11. Each seat 111–113 or 121–123 of bench seats 11, 12 is equipped with a safety belt system, with the safety belt systems for seats 112 and 121 and 122 being designed as two-point belts 21 and the safety belt systems for the seats 111, 113 and 123 which are adjacent to the side walls of the body, being designed as three-point belts 20. Bench seats 11, 12 are anchored in body floor 103 and, as will be described in detail below, can be removed from the small van without assembly tools, so that the area that is then left can be used as a loading area.

Figure 3:
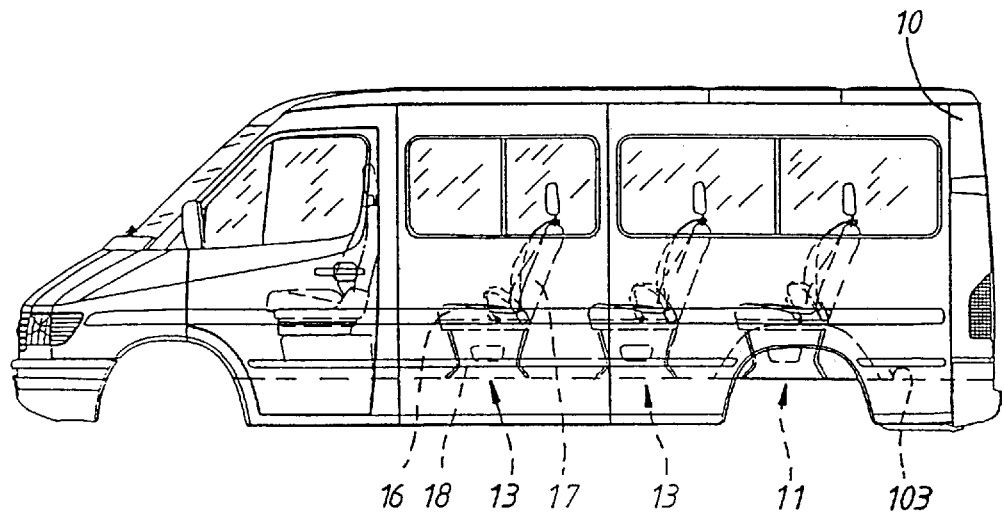
FIG. 3 is a schematic side view of a small van with a bench seat system configured according to a preferred embodiment of the invention and including three bench seats.
Figure 4:
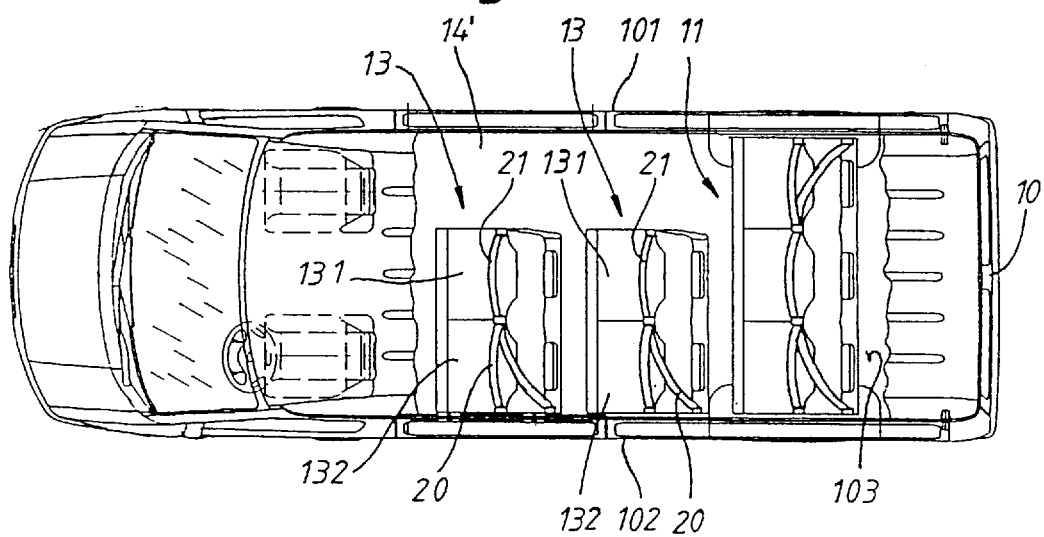
FIG. 4 is a top schematic view, with the van top removed for illustrative purposes, of the small van of FIG. 3.

FIGS. 3 and 4 show a modified small van with a larger wheel base and longer body in a side view and a top view.

This small van is equipped with a total of three bench seats. The rear bench seat 11 corresponds to the rear bench seat 11 of the small van in FIGS. 1 and 2. The two bench seats 13 in front of the rear bench seat are the same and each is made with two seats, with the two bench seats 13 abutting left body side wall 102 at one end and at the other end, at their right sides, leaving a broad access 14' from the door opening in the right-hand body side wall 101 to the middle bench seat 13 and the rear bench seat 11. The width of each seat 131, 132 of bench seat 13 is equal to the seat width of each seat 111–113 of bench seat 11. Each seat 132 adjacent to the side wall of the body of the two bench seats 13 is in turn equipped with a three-point safety belt 20 and each of the other seats 131 of the two bench seats 13 is equipped with a two-point safety belt 21. The two bench seats 13 are anchored in the same way as bench seat 11 in body floor 103. All bench seat types 11–13 are assembled according to the kit principle from prefabricated standard elements and have a seat top frame 15 to receive a seat cushion 16 and a backrest 17 as well as seat feet 18 to anchor the seat upper frame 15 to body floor 103.

Figure 5:
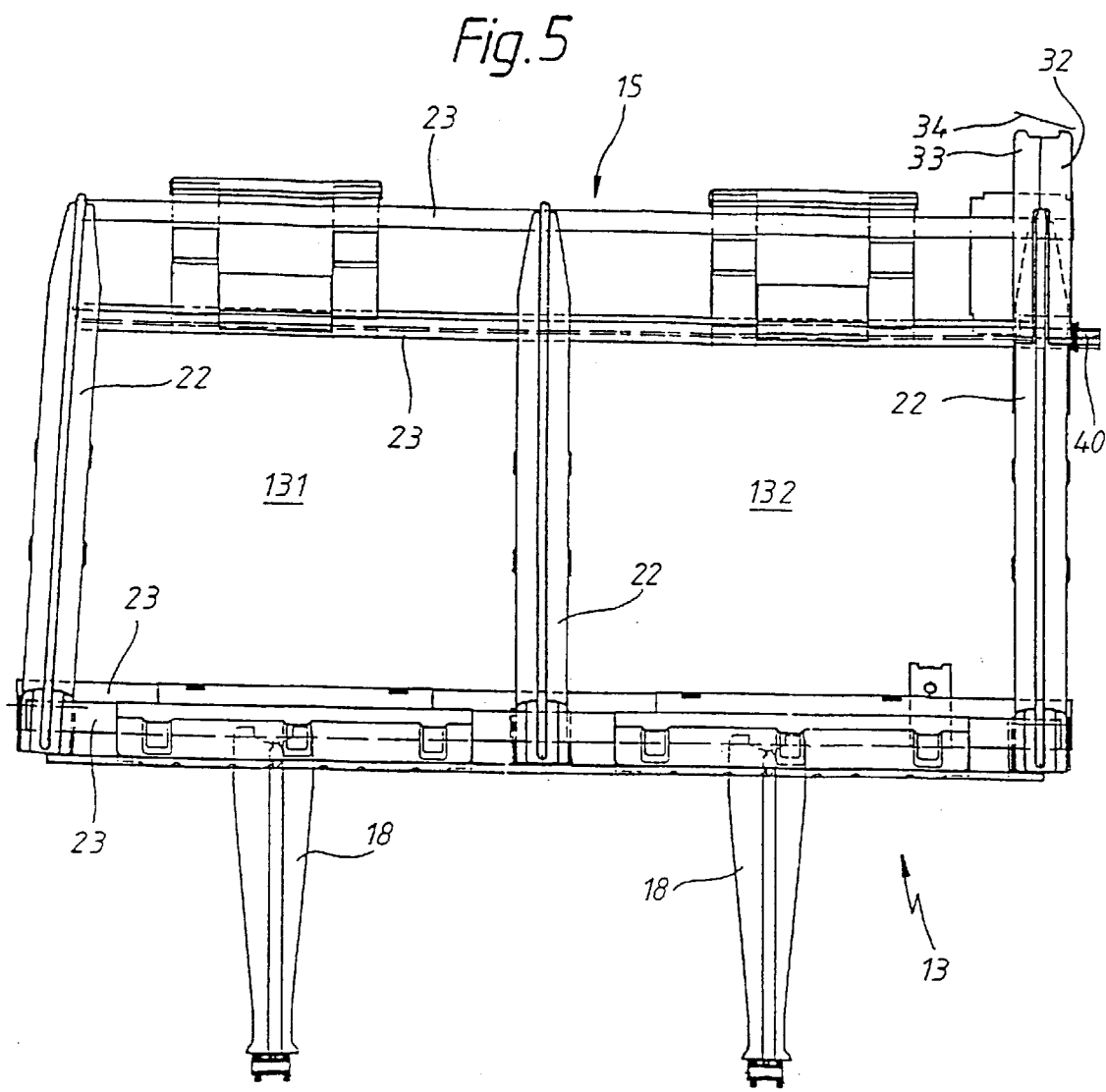
FIG. 5 is a front view of a two-seat bench seat in the unfinished state, constructed according to preferred embodiments of the present invention.
Figure 6:
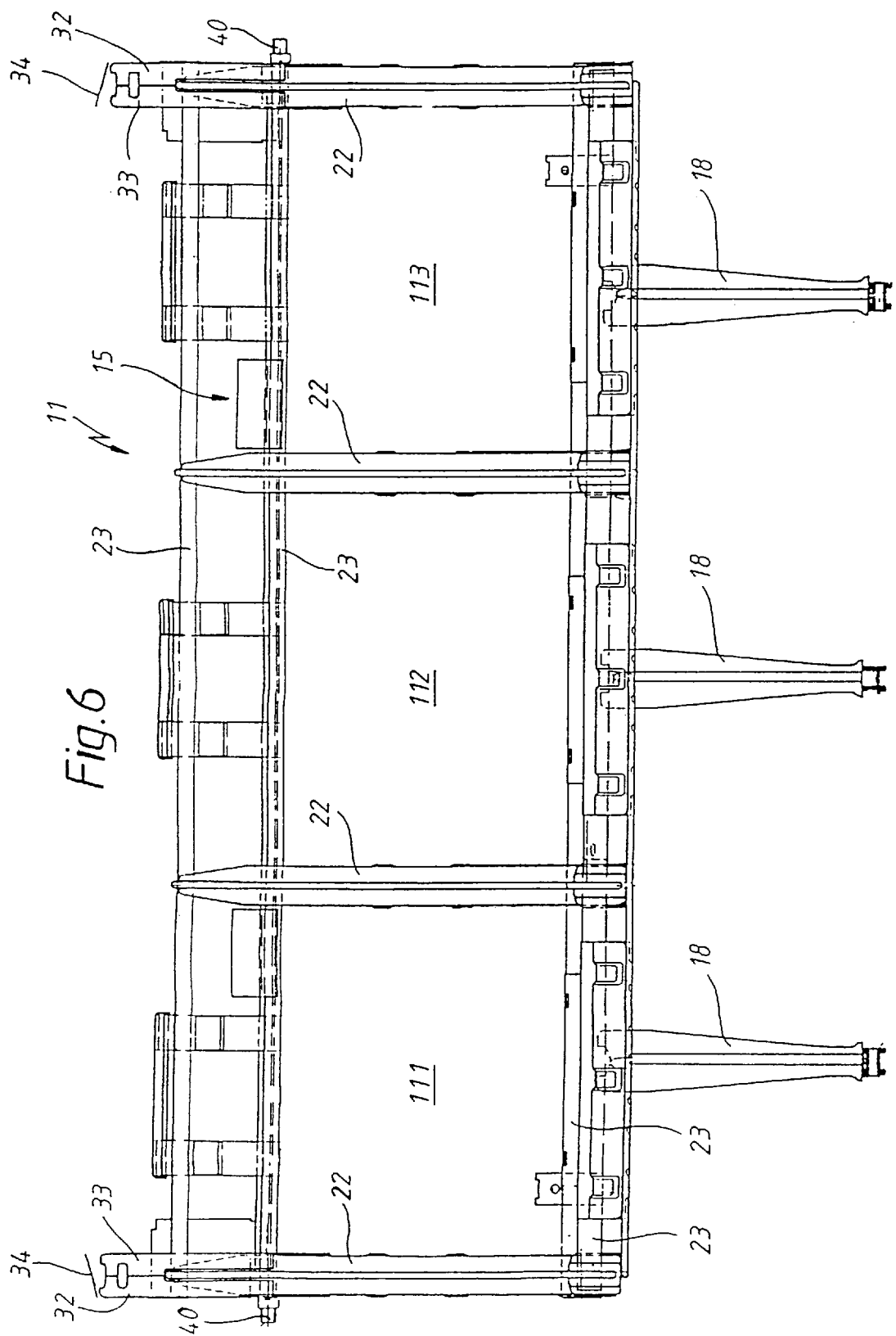
FIG. 6 is similar to FIG. 5, showing a three-seat bench seat, constructed according to another preferred embodiment of the present invention.
Figure 7:
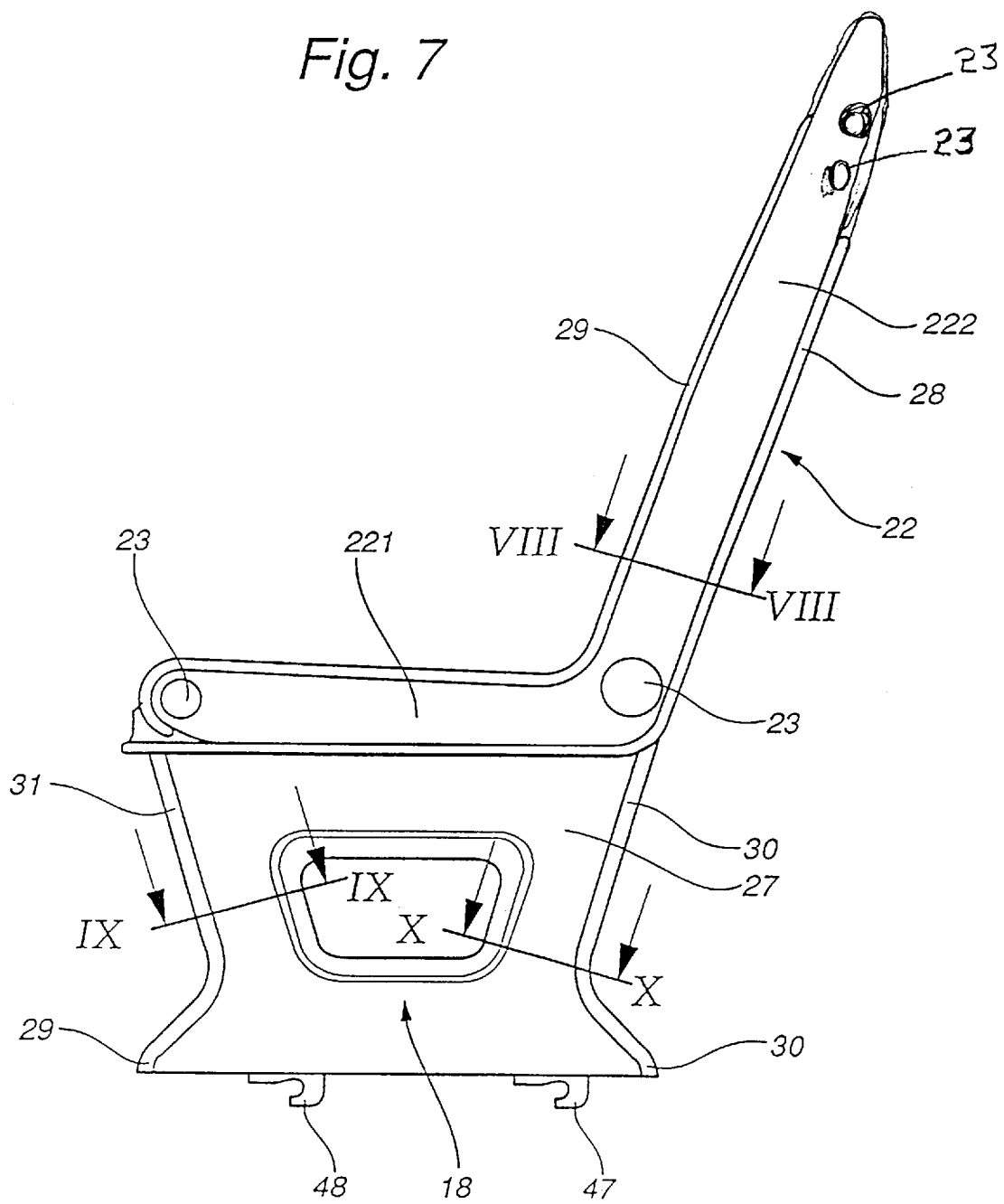
FIG. 7 is a side view of the bench seat in FIG. 5 or 6.

FIG. 5 shows the construction of the two-seat bench seat 13, in unfinished form, in other words, without the seat cushions and backrests. FIG. 6 shows the corresponding construction for the three-seat bench seat. The seat upper frame 15 of bench seat 13 in FIG. 5 is assembled from three L-shaped pillars 22, four cross tubes 23, and two-seat feet 18. The L-shaped pillars 22 are located at distances from one another that correspond to the spacing of the seats, and each delimit laterally a seat 131 or 132. The L-shape of pillars 22 is especially evident in FIG. 7. The short leg 221 of pillar 22 extends approximately horizontally into the seat cushion, while the long leg 222 is inclined at an angle of more than 90° to it and extends for the height of the backrest. The total of three pillars 22 are rigidly connected together by the four cross tubes 23, with two lower cross tubes 23 being connected to the short legs 221 of pillars 22 and two upper cross tubes 23 being connected to the long legs 222 of pillars 22. The two upper cross tubes 23 are guided parallel to and at a distance from one another, and are located at the end of long leg 222, while the lower cross tubes 23 run parallel to and at a distance from one another at the front and rear ends of the short legs 221 of pillars 22. As shown in FIG. 5, cross tubes 23 are passed through pillars 22 and welded to them. Of the two seat feet 18, one seat foot 18 is associated with one seat 131 or 132 respectively and, in the area between two pillars 22, is connected to the two lower cross tubes 23 projecting downward at right angles from them, and welded to cross tube 23.

The three-seat bench seat 11 according to FIG. 6 is assembled in the same structural manner from the individual elements of the kit or modular system, whereby a total of four pillars 22 and three seat feet 18 are provided corresponding to the one additional seat 113. The four pillars 24 arranged parallel to and at a distance from one another are again rigidly connected together by four cross tubes 23 and the total of three seat feet 18 are each connected at right angles in the area between two pillars 22 to the two lower cross tubes 23 and welded thereto.

To achieve a lightweight rigid unfinished structure for bench seats 11, 13, as shown in the cutaway drawings in FIGS. 8–10, pillars 22 and seat feet 18 are each composed of two half shells 24, 25 and 26, 27 to form hollow box sections. The two half shells 24, 25 and 26, 27 made of high-strength steel abut one another at their contact locations with flanges 241 and 251, 242 and 252, and 261 and 271, 262 and 272, said flanges being bent approximately at right angles, with the flange pairs being rolled by means of a rolling tube, jointly to form a rolled seam 28 and 29 or 30 and 31. By virtue of these rolled seams 28–31 on pillar 22 and seat foot 18, a positive connection of the two half shells 24, 25 and 26, 27 is achieved, which requires no additional work steps. The cost of devices and manufacturing time is less than with permanent connections, like those made by spot welding and the like. The accumulation of material in the rolled seam increases the resistance to bending and insures a high resistance to kinking.

In bench seats 11, 13 in FIGS. 5 and 6, the outer pillar 22, which is directly adjacent to one body side wall 101, 102 with a short distance therefrom, is mechanically reinforced at the upper end of its long leg 222, for which purpose two reinforcing sections 32, 33 that are mirror images of one another are placed on the ends of long leg 222 and welded therewith. On reinforcing sections 32, 33, a belt reverser 34, indicated schematically, is fastened for the three-point safety belt 20. In the two-seat bench seat 13 according to FIG. 5, only the left-hand outer pillar 22 is provided with reinforcing sections 32, 33, while in the three seat-bench seat 11 according to FIG. 6, which extends from the right-hand side wall of the body 101 up to the left-hand side wall 102 of the body, both outer pillars 22 are provided with reinforcing sections 32, 33, and each has a belt reverser 34. To conduct belt forces into the side wall of the body 101, 102, in each case the outer pillar 22 next to the side wall is connected to the corresponding body side wall 101 or 102.

Figure 11:
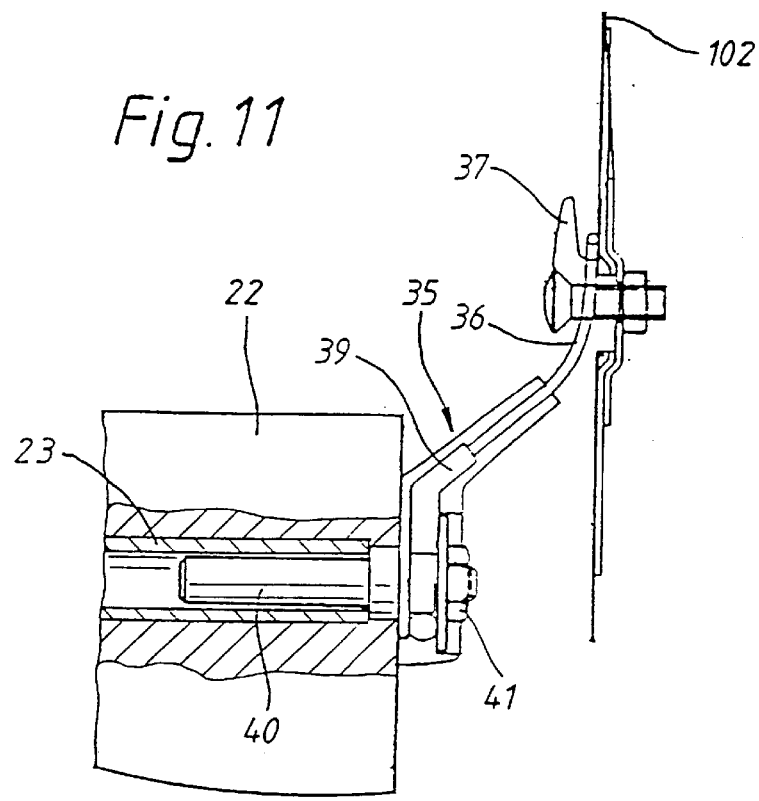
FIG. 11 is a side view of a wall fastening arrangement for the bench seat in FIG. 5 or FIG. 6, constructed according to a preferred embodiment of the invention.
Figure 12:
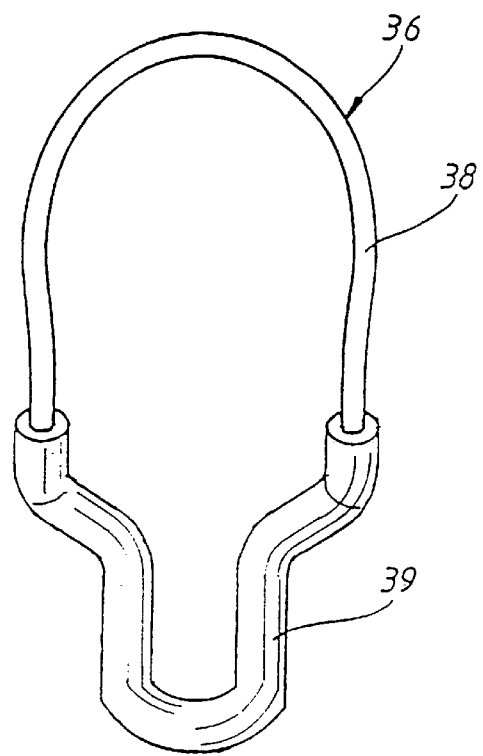
FIG. 12 is a top view of the wall for the wallfastening arrangement in FIG. 11.

To equalize the tolerances between the vehicle floor 103 and the body side wall 101, 102, between bench seat 11, 13 and vehicle body 10, and to avoid the development of noise when side wall vibrations occur during the operation of the vehicle, the wall connection 35, shown in FIGS. 11 and 12, is made flexible. Wall connection 35 consists of a retaining cable 36 attached to pillar 22 and a hook 37 attached to body side wall 101 or 102. Retaining cable 36 is made in the form of a loop 38 which is received endwise in a loop shaped steel thimble 39 (FIG. 12). Steel thimble 39 surrounds a threaded bolt 40 with its two legs and is positively attached by a threaded nut 41 on threaded bolt 40. Threaded bolt 40, which can also be seen in FIGS. 5 and 6 and projects laterally from the outermost pillar 22 in each case, is inserted into the open end of an upper cross tube 23 and welded to the reinforcing sections 32, 33 (FIG. 11). The leg ends of steel thimble 39 which holds the steel cable loop 38 positively by a press connection are bent so that they point away from outer pillar 22. This bending has the advantage that when the bench seat 11, 13 is assembled, loop 38 engages with a high degree of probability automatically behind hook 37 on the body side wall 101 or 102. The hook 37, preferably made of aluminum, is fastened by means of screws to body side wall 101 or 102 and conducts the belt forces transmitted by pillar 22, threaded bolt 40, and retaining cable 36 to vehicle body 10.

In the safety belt systems associated with each seat 111–113 and 131 and 132 of bench seats 11, 13 (three-point safety belt 20 and two-point safety belt 21), in each case the belt end is attached to one of the pillars 22 defining a seat and the belt buckle is attached to the other, so that in each case the middle pillars 22 in FIGS. 5 and 6 associated with two seats 131 and 132 and 111 and 112 and 112 and 113 each have fastening devices for a belt end and a belt buckle of two different safety belt systems. The fastening devices are not shown for the sake of clarity.

To fasten seat feet 18 of each bench seat 11–13 to body floor 103, each seat foot 18 has associated with it a foot receptacle 42 fastened to body floor 103. One such foot receptacle 42 is shown in lengthwise section in FIG. 13.

Each foot receptacle 42 has an elongate mounting plate 49 with two depressions for grooves 43, 44 located on the lengthwise axis of the plate with a distance between them, in each of which depressions or grooves a locking pin 45 or 46 extending transversely to the lengthwise axis of the plate is fastened, with each locking pin 45, 46 being welded to the side walls of the groove. At the end of each seat foot 18, two locking hooks 47, 48 are located with a distance between them lengthwise, said hooks projecting over the lower edge of seat foot 18 so that when seat foot 18 rests on body floor 103, locking hooks 47, 48 project into grooves 43, 44 and fit around locking pins 45, 46 on their sides facing away from the seat foot.

As can be seen from FIG. 13 and the cross section in FIG. 16, each locking hook 47, 48 is formed by two hook sections 52, 53, each extending from, and integral with, the lower edge of two congruent hook strips 50, 51 extending parallel and with a space between them, as well as a cross sheet 54 connecting these two hook sections 52, 53 with one another. Cross sheet 54 follows the contour of hook section 52, 53 and has a cross rib 55 extending from hook strip 50 to hook strip 51, said rib being formed so that it rises in the form of an acute angle toward the bottom of the hook. When the bench seat with its seat feet 10 is inserted vertically into foot receptacles 42, cross rib 55 of locking hooks 47, 48 encounters the corresponding locking pins 45, 46. The diagonal position of cross ribs 55 as shown also in FIG. 13 for front locking hook 48, causes locking hooks 47, 48 to slide forward by the weight of the bench seat onto locking pins 45, 46 so that locking pins 45, 46 slide largely automatically into the bottoms of locking hooks 47, 48.

A manually releasable quick connect 56 is associated with rear locking hook 47, said quick connect, as shown in FIG. 13, locking the rear locking pin 45, which rests in rear locking hook 47, against escaping from locking hook 47. In a bench seat with a plurality of seat feet 18 it is sufficient for such a quick connect 56 to be provided on one seat foot 18. Quick connect 56 has a plunger 57 that is vertically displaceably guided, said plunger, under the influence of a return spring 58, sliding in front of the opening of locking hook 47. As a result, plunger 57 passes through a through opening 59 in cross rib 55 of cross sheet 54. During the vertical displacement movement, plunger 57 is fastened by a guide opening 60 in a connecting sheet 61 as well as by a guide pin 62 extending between hook strips 50, 51. Connecting sheet 61 connects the two hook strips 50, 51 with one another and is on their upper edge, opposite cross sheet 54 of locking hook 47, welded therewith. Guide pin 62 is located at a vertical distance from cross sheet 61.

In addition quick connect 56 includes a hand lever 63 which is designed as a two-armed pivot lever and is pivotably mounted on a pin 64 extending between the two hook strips 50, 51. As indicated in FIG. 16, hand lever 63 is located on the outside wall of seat foot 18, formed by half shell 27. One lever arm 631 of hand lever 63 supports a vertically bent gripping plate 65 while the other pivot arm 632 of hand lever 63 supports a shift nose 66 so arranged that when hand lever 63 in FIG. 13 is pivoted clockwise and strikes locking pin 45, specifically on its back side facing away from plunger 57. From pivot arm 631 of hand lever 63, an engaging pin 67 projects at right angles, said pin projecting through an elongate hole 68 in half shell 27 of seat foot 18 and engaging an engaging opening 69 in plunger 57. By means of engaging pin 67 and engaging opening 69, by pivoting hand lever 63 in FIG. 13 in the clockwise direction plunger 57 is shifted upward against the force of return spring 68 thus clearing the opening of the rear locking hook 47 to allow locking pin 45 to escape.

To remove one of the bench seats 11–13 from the small van, first the quick connect 56 on the bench seat is loosened. For this purpose hand lever 63 in FIG. 13 is pivoted clockwise. The positions assumed successively by pivot lever 63 and quick connect 56 are shown in their exact sequence in FIGS. 14 and 15. By pivoting hand lever 63, first plunger 57 is moved vertically upward in its guides 60 and 62 and return spring 58 is tensioned. When plunger 57 is pulled off locking pin 45, shift nose 66 on hand lever 63 comes to rest against locking pin 45 (FIG. 14). As hand lever 63 is pivoted further, shift nose 66 presses against locking pin 45 causing the bench seat to be moved as a whole slightly rearward so that locking hooks 47, 48 are pushed off locking pins 45, 46. When locking pins 45, 46 have been pushed all the way out of their associated locking hooks 47, 48, at the same time shift nose 66 is pivoted into rear locking hook 47. In this pivoted position (FIG. 15) hand lever 63 engages a lock on seat foot 18, not shown here. The bench seat, which is now no longer secured, can be removed by pulling gently backward on foot receptacles 42 and taken away.

The installation of bench seat 11–13 takes place in the reverse order. The bench seat is placed in the corresponding foot receptacles 42, with quick connect 56 being in the position shown in FIG. 15. The initial contact of seat foot 18 with locking pins 45, 46 takes place through the diagonally mounted cross sheets 54 at locking hooks 47, 48. Under its own weight, the bench seat slides forward. Locking pin 45 presses against shift nose 66 and forces the hand lever 63 in FIG. 15 counterclockwise causing it to pivot so that locking lever 63 is pushed out of its engagement and return spring 58 pulls plunger 57 vertically downward. By means of engaging opening 69 and engaging pin 67 hand lever 63 is pivoted further counterclockwise (FIG. 14), whereupon shift nose 66 completely releases the rear locking hook 47. When the locking pins 45, 46 have penetrated completely into locking hooks 47, 48, under the action of return spring 48, plunger 57 shifts in front of the rear locking pin 45 and hand lever 63 assumes its locking position as shown in FIG. 13.

The invention is not limited to the embodiments described of a multi-seat bench seat. Thus the bench seat can also be equipped with only a single seat as a so-called individual seat. In this case the upper frame of the seat is composed of only two L-shaped pillars 22, four cross pillars 23, and two seat feet 18, with the two pillars 22 delimiting the single seat at left and right. The two seat feet 18 are located between pillars 22 at the two lower cross tubes 23 projecting at right angles downward from them, and in turn are welded to the latter.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A modular bench seat system for passenger vans comprising:
   at least one seat bench having a plurality of adjacent passenger seats,
   a plurality of L-shaped pillars which in use are disposed at respective opposite lateral sides of respective ones of said seat benches, each said L-shaped pillar including a long leg forming a substantially vertically extending seat back support and a short leg forming a substantially horizontally extending seat cushion support, a plurality of cross tubes for connecting said L-shaped pillars together, said cross tubes including at least one lower cross tube extending through a plurality of respective ones of said short legs and at least one upper cross tube extending through a plurality of respective ones of said long legs and over said plurality of adjacent passenger seats, and a plurality of seat feet for supportably connecting some of said cross tubes to a vehicle floor at a position intermediate respective pairs of said L-shaped pillars, wherein said L-shaped pillars and said cross tubes are configured to permit adjustment of said pillars along the length of the cross tubes to accommodate modular assembly of differently configured seat benches utilizing standard L-shaped pillars and cross tubes.

2. A modular bench seat system according to claim 1, wherein said lower cross tubes are passed through the pillars and welded to them.

3. A modular bench seat system according claim 1, wherein at least one of said cross tubes is passed through the pillars and welded to them.

4. A method of making bench seat assemblies for small vans, comprising:

providing at least one seat bench having a plurality of adjacent passenger seats, providing a plurality of similarly configured L-shaped pillars which each have a long leg forming a substantially vertically extending seat back support and a short leg forming a substantially horizontally extending seat cushion support, providing a plurality of cross tubes, providing a plurality of similarly configured seat feet, 13 connecting respective ones of said cross tubes to respective L-shaped pillars to hold two of said L-shaped pillars at respective opposite lateral sides of respective ones of said seat benches and a third of said L-shaped pillars intermediate ends of said respective seat bench, said cross tubes including two lower cross tubes at a level of said seat cushion supports of the L-shaped pillars and at least one upper cross tube at a level above said seat cushion supports and through a plurality of said long legs and over said plurality of adjacent passenger seats, and rigidly connecting one seat foot for each seat of each respective seat bench at the two cross tubes at the level of said seat cushion supports and at a position intermediate the L-shaped pillars, wherein said L-shaped pillars and said cross tubes are configured to permit adjustment of said pillars along the length of the cross tubes to accommodate modular assembly of differently configured seat benches utilizing standard L-shaped pillars and cross tubes.

5. A method according to claim 4, wherein said rigidly connecting includes welding said cross tubes to said respective L-shaped pillars and seat feet.

6. A method according to claim 4, wherein said providing said pillars and seat feet includes forming said pillars and seat feet as hollow members from adjoining sheet material sections.

7. A method according to claim 4, wherein said lower cross tubes are passed through the pillars and welded to them.

8. A method according according to claim 7, wherein all of said cross tubes are passed through the pillars and welded to them.

9. Bench seat system for motor vehicles such as small vans, comprising:

a seat bench having a plurality of adjacent passenger seats, an L-shaped pillar at each side of said seat bench and at least one L-shaped pillar intermediate said sides, each said L-shaped pillar including a long leg forming a substantially vertically extending seat back support and a short leg forming a substantially horizontally extending seat cushion support, at least one lower cross tube connecting said short legs of said L-shaped pillars together, at least one upper cross tube extending through and rigidly connecting a plurality of said long legs of said L-shaped pillars together, said at least one upper cross tube extending over said plurality of adjacent passenger seats, and at least one seat foot supportably connected to the at least one lower cross tube and extending downwardly to a vehicle floor when in an in-use position in a vehicle, wherein said short legs of said L-shaped pillars and said at least one lower cross tube and at least one upper cross tube are configured to permit adjustment of said pillars along the length of the at least one lower cross tube and the at least one upper cross tube to thereby accommodate modular assembly of differently configured seat benches utilizing standard L-shaped pillars and lower cross tubes and the at least one upper cross tube.

10. Bench seat system according to claim 9, wherein at least two of said lower cross tubes are connected to respective short legs of adjacent L-shaped pillars.

11. Bench seat system according to claim 10, wherein said at least one seat foot is connected by welding to each of said at least two lower cross tubes connected to said respective short legs of adjacent L-shaped pillars.

12. Bench seat system according to claim 10, wherein each of said cross tubes extend over the width of all of said seats in said seat bench.

13. Bench seat system according to claim 12, wherein a respective one of said seat feet is associated with each of said seats and is located substantially centrally between respective adjacent ones of said L-shaped pillars.

14. Bench seat system according to claim 10, wherein a respective one of said seat feet is associated with each of said seats and is located substantially centrally between respective adjacent ones of said L-shaped pillars.

15. Bench seat system according to claim 10, wherein said L-shaped pillars include an outer pillar disposed adjacent a vehicle side wall when said seat bench is in an in-use installed position in a vehicle, and wherein a retaining cable is fastened to an upper end of the long leg of said outer pillar, said retaining cable being adapted to be fastened to a side wall of a vehicle.

16. Bench seat system according to claim 15, wherein the retaining cable is made in the form of a loop, which loop is positively accommodated endwise in a shackle-shaped steel thimble, and wherein the steel thimble is held on a threaded bolt inserted endwise into an upper one of said cross tubes.

17. Bench seat system according to claim 16, wherein the steel thimble includes two shackle legs with respective leg ends, and wherein the leg ends of the two shackle legs of the steel thimble are bent so that they point away from the outer pillar.

18. Bench seat system according to claim 16, wherein a threaded bolt is threadably engaged into an axial end of an upper one of said upper cross tubes at said outer pillar, said bolt serving to form an anchor for said retaining cable.

19. Bench seat system according to claim 10, wherein said L-shaped pillars include an outer pillar disposed adjacent a vehicle side wall when said seat bench is in an in-use installed position in a vehicle, comprising a belt guide for a three-point safety belt fastened at an upper end of said outer pillar.

20. Bench seat system according to claim 19, wherein said outer pillar is reinforced by substantially mirror symmetrical reinforcing sections at a fastening location for the belt guide.

21. Bench seat system according to claim 10, wherein one of a fastening device for the belt and/or a belt buckle of a safety belt system is provided on each pillar, and wherein the safety belt system for the seats next to vehicle side walls are equipped with reinforced outer pillar leg ends supporting a three-point safety belt and the safety belt system for the other seats is designed as a two-point safety belt.

22. Bench seat system according to claim 10, wherein a foot receptacle fastened to a vehicle body floor is associated with each seat foot,
 wherein each foot receptacle has associated with it an elongate mounting plate with two grooves located on a lengthwise axis of the plate with a distance between them,
 wherein two locking pins are provided one each located in one of said grooves transversely to the lengthwise axis of the plate,
 wherein on the end of each seat foot facing away from the seat upper frame, locking hooks project which are fixed and located at a distance from one another, said hooks fitting behind the locking pins when the seat bench is installed, and
 wherein at least one seat foot has a manually releasable quick connect associated with it, which prevents the locking pin overlapped by a locking hook from escaping from the locking hook.

23. Bench seat system according to claim 22, wherein each locking hook is formed by two hook shapes each projecting from the lower edge of two congruent hook strips extending parallel and with a distance between them and integral therewith, and a cross sheet connecting the latter with one another, said cross sheet having a cross rib rising at an acute angle to the rear hook strip end.

24. Bench seat system according to claim 23, wherein the quick connect has a vertically guided displaceable plunger which pushes itself in front of the hook opening under the influence of a return spring, as well as a hand lever for displacing the plunger against the force of a return spring, and
 wherein a through opening for the plunger is provided in the cross rib of cross sheet associated with the locking hook.

25. Bench seat system according to claim 24, wherein the hand lever is pivotably mounted on at least one of the hook strips, and
 wherein the hand lever has an engaging pin projecting transversely, said pin engaging positively in an engaging opening in the plunger to entrain the plunger.

26. Bench seat system according to claim 25, wherein the hand lever is designed as a two-armed pivot lever, one pivot arm end having a shift nose so formed that when the hand lever is pivoted into its unlocking position, it strikes the locking pin on the side that faces the bottom of the locking hook.

27. Bench seat system according to claim 24, wherein the two hook strips are connected together by a connecting sheet that is fastened on the upper edge of the two hook strips and has a guide opening for the plunger, and
 wherein a guide pin sliding on the plunger is held between the hook strips at a vertical distance from the connecting sheet.

28. Bench seat system according to claim 10, wherein at least one of said cross tubes is passed through the pillars and welded to them.

29. Bench seat system according to claim 10, wherein all of said cross tubes are passed through the pillars and welded to them.

30. Bench seat system according to claim 9, wherein said at least one seat foot is connected by welding to at least one of said lower cross tubes.

31. Bench seat system according to claim 9, wherein each of said L-shaped pillars is formed of two half shells made of high strength metal, and wherein the two half shells are joined together along respective contact points by a rolled seam.

32. Bench seat system according to claim 31, wherein said metal is steel.

33. Bench seat system according to claim 31, wherein each of said seat feet is formed of two half shells made of high strength metal, and wherein the two half shells are joined together along respective contact points by a rolled seam.

34. Bench seat system according to claim 33, wherein the two half shells of respective pairs of half shells contact one another at their contact points with roughly rectangularly bent flanges, which flanges are rolled commonly by a rolling tool to form said rolled seams.

35. Bench seat system according to claim 9, wherein each of said seat feet is formed of two half shells made of high strength metal, and wherein the two half shells are joined together along respective contact points by a rolled seam.

36. Bench seat system according to claim 35, wherein said metal is steel.

37. Bench seat system according to claim 9, wherein said L-shaped pillars, said cross tubes, and said seat feet are all standardized respectively similar parts which can alternatively be used for forming a plurality of different bench seat systems.

38. Bench seat system according to claim 9, wherein said lower cross tubes are passed through the pillars and welded to them.

39. Bench seat system with a plurality of passenger seats disposed adjacent one another in a common seat bench, comprising:
 an L-shaped pillar at each side of each passenger seat, each said L-shaped pillar including a long leg forming a substantially vertically extending seat back support and a short leg forming a substantially horizontal extending seat cushion support,
 a plurality of cross tubes rigidly connecting together said L-shaped pillars,
 and at least one seat foot for each seat which is supportedly connected to at least one of the cross tubes and extends downwardly to a vehicle floor when in an in-use position in a vehicle,
 wherein said L-shaped pillars include an outer pillar disposed adjacent a vehicle side wall when said seat bench is in an in-use installed position in a vehicle, and
 wherein a retaining cable is fastened to an upper end of the long leg of said outer pillar, said retaining cable being adapted to be fastened to a side wall of a vehicle.

40. Bench seat system according to claim 32, wherein the retaining cable is made in the form of a loop, which loop is positively accommodated endwise in a shackle-shaped steel thimble, and wherein the steel thimble is held on a threaded bolt inserted endwise into an upper one of said cross tubes.

41. Bench seat system according to claim 40, wherein the steel thimble includes two shackle legs with respective leg ends, and wherein the leg ends of the two shackle legs of the steel thimble are bent so that they point away from the outer pillar.

42. Bench seat system according to claim 39, wherein a threaded bolt is threadably engaged into an axial end of an upper one of said upper cross tubes at said outer pillar, said bolt serving to form an anchor for said retaining cable.

43. Bench seat system according to claim 39, wherein at least two of said cross tubes are connected to respective short legs of adjacent L-shaped pillars, and wherein at least one of said cross tubes is connected to respective long legs of adjacent L-shaped pillars.

44. Bench seat system with a plurality of passenger seats disposed adjacent one another in a common seat bench, comprising:

an L-shaped pillar at each side of each passenger seat, each said L-shaped pillar including a long leg forming a substantially vertically extending seat back support and a short leg forming a substantially horizontal extending seat cushion support, a plurality of cross tubes rigidly connecting together said L-shaped pillars, and at least one seat foot for each seat which is supportedly connected to at least one of the cross tubes and extends downwardly to a vehicle floor when in an in-use position in a vehicle, wherein one of a fastening device for the belt and/or a belt buckle of a safety belt system is provided on each pillar, and wherein the safety belt system for the seats next to vehicle side walls are equipped with reinforced outer pillar leg ends supporting a three-point safety belt and the safety belt system for the other seats is designed as a two-point safety belt.

45. Bench seat system according to claim 44, wherein at least two of said cross tubes are connected to respective short legs of adjacent L-shaped pillars, and wherein at least one of said cross tubes is connected to respective long legs of adjacent L-shaped pillars.

46. Bench seat system with a plurality of passenger seats disposed adjacent one another in a common seat bench, comprising:

an L-shaped pillar at each side of each passenger seat, each said L-shaped pillar including a long leg forming a substantially vertically extending seat back support and a short leg forming a substantially horizontal extending seat cushion support, a plurality of cross tubes rigidly connecting together said L-shaped pillars, and at least one seat foot for each seat which is supportedly connected to at least one of the cross tubes and extends downwardly to a vehicle floor when in an in-use position in a vehicle, wherein each foot receptacle has associated with it an elongate mounting plate with two grooves located on a lengthwise axis of the plate with a distance between them, wherein two locking pins are provided one each located in one of said grooves transversely to the lengthwise axis of the plate, wherein on the end of each seat foot facing away from the seat upper frame, locking hooks project which are fixed and located at a distance from one another, said hooks fitting behind the locking pins when the seat bench is installed, wherein at least one seat foot has a manually releasable quick connect associated with it, which prevents the locking pin overlapped by a locking hook from escaping from the locking hook, and wherein each locking hook is formed by two hook shapes each projecting from the lower edge of two congruent hook strips extending parallel and with a distance between them and integral therewith, and a cross sheet connecting the latter with one another, said cross sheet having a cross rib rising at an acute angle to the rear hook strip end.

47. Bench seat system according to claim 46, wherein the quick connect has a vertically guided displaceable plunger which pushes itself in front of the hook opening under the influence of a return spring, as well as a hand lever for displacing the plunger against the force of a return spring, and wherein a through opening for the plunger is provided in the cross rib of cross sheet associated with the locking hook.

48. Bench seat system according to claim 47, wherein the hand lever is pivotably mounted on at least one of the hook strips, and wherein the hand lever has an engaging pin projecting transversely, said pin engaging positively in an engaging opening in the plunger to entrain the plunger.

49. Bench seat system according to claim 48, wherein the hand lever is designed as a two-armed pivot lever, one pivot arm end having a shift nose so formed that when the hand lever is pivoted into its unlocking position, it strikes the locking pin on the side that faces the bottom of the locking hook.

50. Bench seat system according to claim 47, wherein the two hook strips are connected together by a connecting sheet that is fastened on the upper edge of the two hook strips and has a guide opening for the plunger, and wherein a guide pin sliding on the plunger is held between the hook strips at a vertical distance from the connecting sheet.

* * * * *